United States Patent

Lin et al.

[19]

[11] Patent Number: 5,881,279
[45] Date of Patent: Mar. 9, 1999

[54] METHOD AND APPARATUS FOR HANDLING INVALID OPCODE FAULTS VIA EXECUTION OF AN EVENT-SIGNALING MICRO-OPERATION

[75] Inventors: Derrick Chu Lin, Foster City; Champa R. Yellamilli, Cupertino; Charkravaythy Kosaraju; Nimish Modi, both of Sunnyvale; Ed Grochowski, San Jose, all of Calif.

[73] Assignee: Intel Corporation, Santa Clara, Calif.

[21] Appl. No.: 756,074

[22] Filed: Nov. 25, 1996

[51] Int. Cl.$^6$ .................................................. G06F 9/318
[52] U.S. Cl. ........................... 395/591; 395/385; 395/568
[58] Field of Search ..................... 395/568, 591, 395/385, 384

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,167,778 | 9/1979 | Sipple | 395/384 |
| 4,393,468 | 7/1983 | New | 364/736 |
| 4,415,969 | 11/1983 | Bayliss et al. | 395/568 |
| 4,418,383 | 11/1983 | Doyle et al. . | |
| 4,498,177 | 2/1985 | Larson | 371/52 |
| 4,707,800 | 11/1987 | Montrone et al. | 364/788 |
| 4,771,379 | 9/1988 | Ando et al. . | |
| 4,989,168 | 1/1991 | Kuroda et al. | 364/715.09 |
| 5,095,457 | 3/1992 | Jeong | 364/758 |
| 5,187,679 | 2/1993 | Vassiliadis et al. | 364/786 |
| 5,235,686 | 8/1993 | Bosshart | 395/597 |
| 5,479,616 | 12/1995 | Garibay, Jr. et al. | 395/591 |
| 5,619,408 | 4/1997 | Black et al. | 395/567 |
| 5,625,788 | 4/1997 | Boggs et al. | 395/390 |
| 5,632,028 | 5/1997 | Thusoo et al. | 395/568 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

(List continued on next page.)

*Primary Examiner*—Richard L. Ellis
*Attorney, Agent, or Firm*—Blakely, Sokoloff, Taylor & Zafman LLP

[57] ABSTRACT

A microprocessor that handles invalid opcodes via an event-signaling micro-operation is disclosed. The microprocessor comprises a decoder that decodes macroinstructions, including an opcode, into a single microprocessor cycle micro-operation. The decoder detects invalid opcodes and replaces the invalid opcodes with an event-signaling micro-operation that triggers an invalid opcode assist. The invalid opcode assist triggers an invalid opcode exception handler that processes the invalid opcode.

16 Claims, 5 Drawing Sheets

OTHER PUBLICATIONS

*Errata to MC88110 Second Generation RISC Microprocessor User's Manual,* Motorola Inc. (1992), pp. 1–11.

*MC88110 Programmer's Reference Guide,* Motorola Inc. (1992), pp. 1–4.

*i860™ Microprocessor Family Programmer's Reference Manual,* Intel Corporation (1992), Ch. 1, 3, 8, 12.

R. B. Lee, *Accelerating Multimedia With Enhanced Microprocessors,* IEEE Micro (Apr. 1995), pp. 22–32.

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16, 17.

Sparc Technology Business, *UltraSparc Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, Digest of Technical Papers; IEEE International (1980).

B. Case, *Philips Hopes to Displace DSPs with VLIW,* Microprocessor Report (Dec. 1994), pp. 12–15.

L. Gwennap, *UltraSparc Adds Multimedia Instructions,* Microprocessor Report (Dec. 1994), pp. 16–18.

N. Margulis, *i860 Microprocessor Architecture,* McGraw Hill, Inc. (1990) Ch. 6, 7, 8, 10, 11.

*Pentium Processor User's Manual, vol. 3: Architecture and Programming Manual,* Intel Corporation (1993), Ch. 1, 3, 4, 6, 8, and 18.

METHOD AND APPARATUS FOR HANDLING INVALID OPCODE FAULTS VIA EXECUTION OF AN EVENT-SIGNALING MICRO-OPERATION

FIELD OF THE INVENTION

The present invention relates to the field of microprocessor design; more particularly, the present invention relates to a method and apparatus for handling invalid opcode faults via an event-signaling micro-operation.

BACKGROUND OF THE INVENTION

One way to improve the performance of a computer system is the implementation of a Reduced Instruction Set (RISC) microprocessor. RISC microprocessors use a smaller instruction set than Complex Instruction Set (CISC) microprocessors. Because less hardware is required to implement a smaller instruction set, RISC instructions tend to be executed more quickly than CISC instructions.

However, because of an established base of CISC software, it is desirable to provide RISC microprocessors that are capable of executing CISC instructions to maintain compatibility with existing software. In order to execute CISC instructions, RISC microprocessors typically have one or more decoders that translate CISC macroinstructions into one or more RISC micro-operations prior to execution.

In order to more efficiently use microprocessor resources, some of the decoders may not be fully functional decoders capable of decoding any instruction in the CISC instruction set. For example, one or more of the decoders may be limited to decoding instructions that can be executed by a single-cycle RISC micro-operation. Alternatively, a decoder may only translate a subset of the CISC instructions that is used most often.

Because any decoder may receive an invalid opcode, each decoder must be capable of invoking an invalid opcode exception handler, whether or not the decoder is fully functional. However, if a decoder is limited to producing only one single-cycle micro-operation, a fault handler cannot be invoked directly because a fault handler typically requires more information than can be provided by a single-cycle micro-operation. Invocation of an exception handler typically requires the type of exception that was caused and the exception handler to be invoked.

Thus, it would be desirable to provide a method and apparatus for triggering invalid opcode exceptions with a single-cycle micro-operation, such as an event-signaling micro-operation.

SUMMARY OF THE INVENTION

A method and apparatus for handling an invalid opcode fault via an event-signaling micro-operation is described. A plurality of decoders are provided to decode macroinstructions to one or more micro operations executable by the processor. According to one embodiment, one decoder decodes all macroinstructions, while two decoders only decode macroinstructions that are executed by a single-cycle micro-operation.

The single-cycle decoders process invalid opcode faults by replacing the invalid opcodes with an event-signaling micro-operation. The event-signaling micro-operation then invokes an invalid opcode assist, which invokes an invalid opcode fault handler to process the invalid opcode according to the processor architecture.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for handling invalid opcode faults via an event-signaling micro-operation are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

According to one embodiment of the present invention, software to be executed is written with instructions from a CISC instruction set. The instructions from the CISC instruction set are known as "macroinstructions." Typically, macroinstructions are variable in length; each macroinstruction has an opcode and variable amounts of data and operands associated with the opcode.

Each macroinstruction is translated into one or more "micro-operations" or "micro-ops," which correspond to instructions in a RISC instruction set executable by the processor. Micro-operations also have an opcode; however, they are fixed in length. The opcode contained in the macroinstruction may or may not be the same as the opcode contained in the micro-operation. For example, a move macroinstruction is translated into a move micro-operation. A more complex macroinstruction is translated into multiple micro-operations. For example, a push operation may be replaced with a store micro-operation and an increment micro-operation.

The translation occurs dynamically in the processor. Externally the processor is programmed as a CISC processor, but executes RISC micro-ops. Thus, a RISC processor may be compatible with pre-existing CISC-based software.

Figure 1:
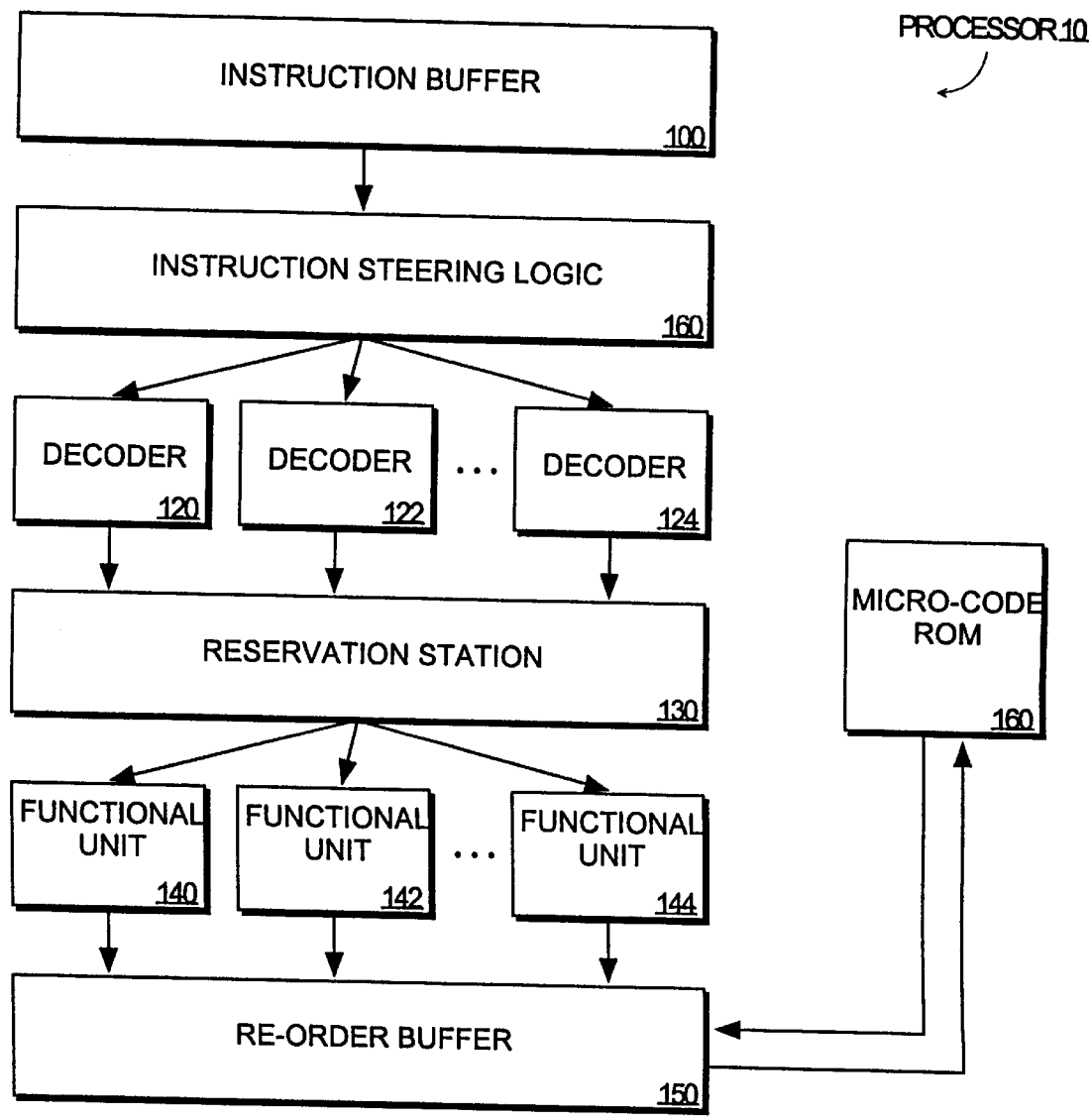
FIG. 1 is a block diagram of one embodiment of a microprocessor according to the present invention.

FIG. 1 is a block diagram of processor 10, which comprises instruction buffer 100 that receives macroinstructions to be executed by processor 10. Coupled to the output instruction buffer 100 is instruction steering logic 110, which is coupled to a plurality of decoders, such as decoders 120, 122 and 124.

Each decoder may have different functionality. For example, decoder 120 may be a fully-functional decoder that decodes any macroinstruction in the CISC instruction set into one or more RISC micro-operations. Decoders 122 and 124 may be single-cycle decoders that decode only a subset of the CISC instruction set that can be decoded into a single-cycle RISC micro-operation. For purposes of the following description, it will be assumed that decoder 120 is a fully-functional decoder and decoders 122 and 124 are single-cycle decoders, however, other embodiments may be used without deviating from the spirit and scope of the present invention.

Instruction steering logic 110 determines whether a macroinstruction can be decoded properly by a single-cycle decoder, or whether a fully functional decoder is required and directs the macroinstruction accordingly. Micro-operation output queue 130 is coupled to receive micro-operations generated by decoders 120, 122 and 124. Micro-operation output queue 130 is coupled to one or more execution units (e.g., 140, 142 and 144). Each execution unit typically executes a particular type of instruction. For example, execution unit 140 may execute only integer micro-operations, while execution unit 142 executes floating-point micro-operations and execution unit 144 executes certain special purpose micro-operations. Alternative combinations may also be used.

Micro-operation output queue 130 consists of a queue for each execution unit. As micro-operations are received by micro-operation output queue 130, the micro-operations are placed in the queue corresponding to the execution unit that executes the micro-operation. For example, an floating-point add micro-operation is placed in the queue corresponding to the floating-point adder. Micro-operations are maintained in the appropriate queue until sent to an execution unit.

Each execution unit is coupled to reorder buffer (ROB) 150, which retires the micro-operations in order of their issuance such that the macroinstructions are executed in strict von Neumann order. ROB 150 may be replaced by any logic that is configured to detect event-signaling micro-operations and invoke a invalid opcode fault handler in response. For example, a dedicated circuit may be designed for the purpose of detecting event-signaling micro-operations and taking appropriate action.

Alternatively, a circuit that detects event-signaling micro-operations may be incorporated into other circuits of processor 10. ROB 150 is also coupled to microcode ROM 160, which is described below.

Figure 2:
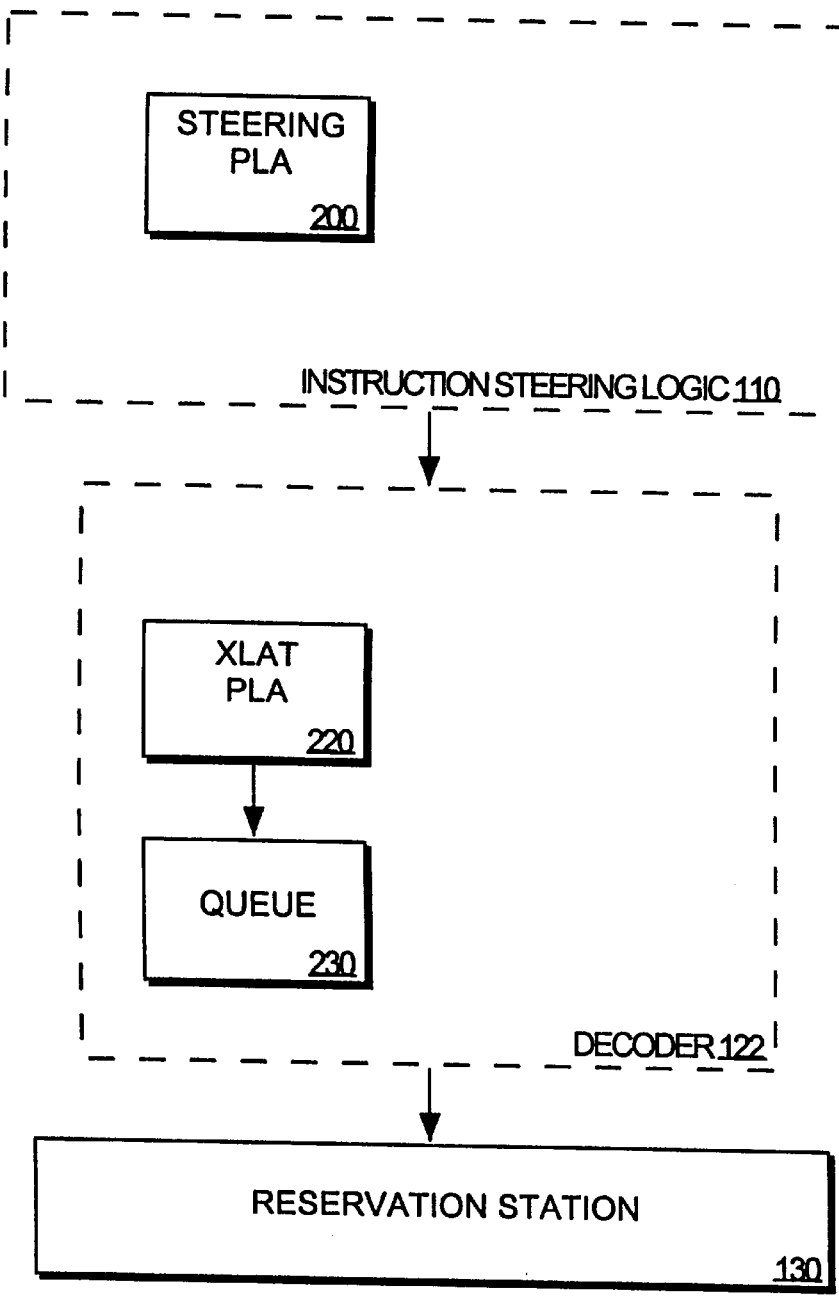
FIG. 2 is a block diagram of one embodiment of a microprocessor instruction steering logic and a decoder according to the present invention.

FIG. 2 is a block diagram of instruction steering logic 110 and decoder 122. While decoder 122 is the only decoder described, all of the decoders of processor 10 may contain the same elements. Decoder 122 contains elements in addition to those shown; however, in order to avoid obscuring the present invention, only the elements relevant to the present invention are shown.

Instruction steering logic 110 contains a steering programmable logic array (PLA) 200, which determines whether a particular macroinstruction can be properly decoded by single-cycle decoders 122 and 124, or whether fully functional decoder 120 is required. If a macroinstruction can be properly decoded by a single-cycle decoder, the macroinstruction is sent to decoder 122 or decoder 124. Otherwise, the macroinstruction is sent to decoder 120.

In order to simplify steering PLA 200, opcodes may be grouped by rows. For example, one row of steering PLA 200 may contain only invalid opcodes, while another row may contain only opcodes that can be translated to single-cycle micro-operations and a third row may contain complex opcodes that can only be executed by multiple micro-operations.

Grouping similar opcodes on the same line within steering PLA 200 allows decoding to be simplified because complete decoding is not required. Only the portions of the opcodes used to determine the row within steering PLA 200 that corresponds to the opcode are decoded. For example, if a row contains only single-cycle opcodes, only the portions of the opcode that designate the row are decoded before the opcode is sent to a single-cycle decoder.

As the size of an instruction set increases, the number of invalid opcodes decreases, which reduces regularity within steering PLA 200. When the number of invalid opcodes is large, invalid opcodes can be assigned to a row within steering PLA 200 such that a row within steering PLA 200 represents only invalid opcodes. However, if instructions are added or the number of invalid opcodes is small, invalid opcodes may be interspersed throughout steering PLA 200 and rows may not represent similarly handled opcodes.

When an opcode must be fully decoded to determine whether the opcode is valid, decoding takes longer than partial decoding, which decreases processor performance. In order to avoid full decoding at the steering PLA 200 level when a row does not contain exclusively single-cycle opcodes, rows within steering PLA 200 are defined as containing valid single-cycle opcodes that can be decoded by single-cycle decoders 122 and 124. However, entries in these rows contain either single-cycle opcodes or invalid opcodes, both of which are sent to single-cycle decoders 122 and 124. Thus, steering PLA 200 sends certain invalid opcodes to single-cycle decoders 122 and 124 rather than to decoder 120, which generally receives invalid opcodes.

Decoder 122 contains translate (XLAT) PLA 220 and a micro-operation register 230. XLAT PLA 220 translates macroinstructions received by decoder 122 to micro-operations. In single-cycle decoder 122 and 124, XLAT PLA 220 may be smaller than steering PLA 200 because single-cycle decoders 122 and 124 decode only a subset of the CISC instruction set. Micro-operation register 230 stores the micro-operations until decoder 122 outputs micro-operations to the micro-operation output queue 130.

If decoder 122 receives a valid opcode, XLAT PLA 220 translates the opcode to a single-cycle micro-operation. The micro-operation is then stored in micro-op register 230 until the micro-operation is output from decoder 122. In the present invention, because single-cycle decoders 122 and 124 may receive invalid opcodes, these decoders are able to trigger an invalid opcode fault handler.

If decoder 122 receives an invalid opcode, the invalid opcode is replaced by an event-signaling micro-operation, which is executed in a single processor cycle to trigger an invalid opcode assist. The invalid opcode assist triggers an invalid opcode exception handler that processes the invalid opcode in accordance with exception handling techniques as defined by the processor architecture.

By defining only one invalid opcode assist in processor 10, only one piece of information is required to Trigger the invalid opcode assist and the event-signaling micro-operation can be executed in a single microprocessor clock cycle. The invalid opcode assist then triggers the invalid opcode exception handler. Because the only function of the invalid opcode assist is to trigger the invalid opcode exception handler, the assist must only convey the cause of the fault, which can be done in a single processor cycle.

Figure 3:
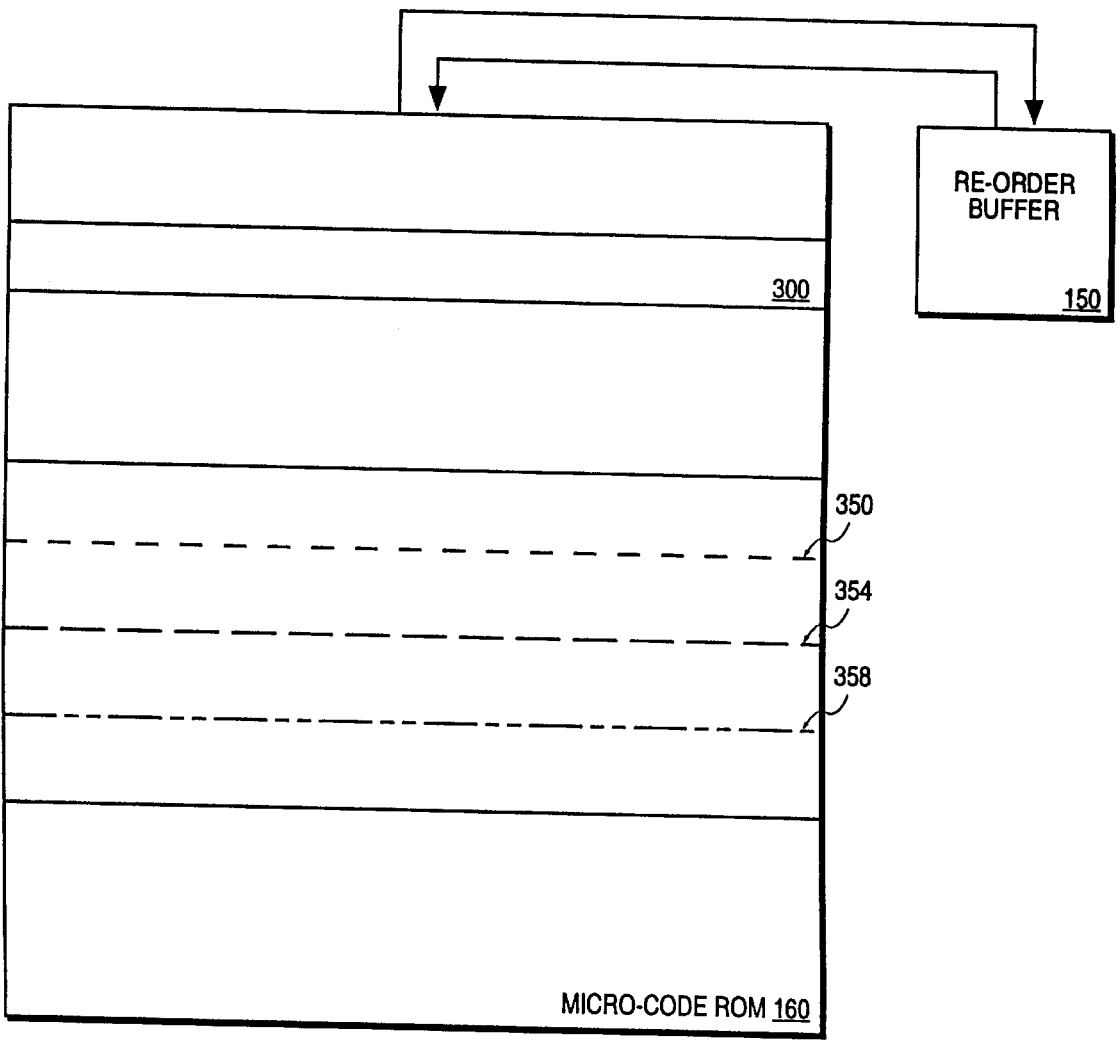
FIG. 3 is a block diagram of one embodiment of a microcode read-only memory (ROM) in a microprocessor and a reorder buffer (ROB) according to the present invention.

FIG. 3 is microcode ROM 160 and ROB 150 according to one embodiment of the present invention. When an event-signaling micro-operation is encountered in ROB 150, the invalid opcode assist 300 stored in microcode ROM is executed. Invalid opcode assist 300 may either directly invoke the invalid opcode exception handler (354, for example) in the exception handler space (350, 354, 358) of microcode ROM 160, or it may indicate to ROB 150 which exception handler should be invoked. Invalid opcode exception handler 354 then processes invalid opcodes as defined by the architecture of processor 10.

Figure 4:
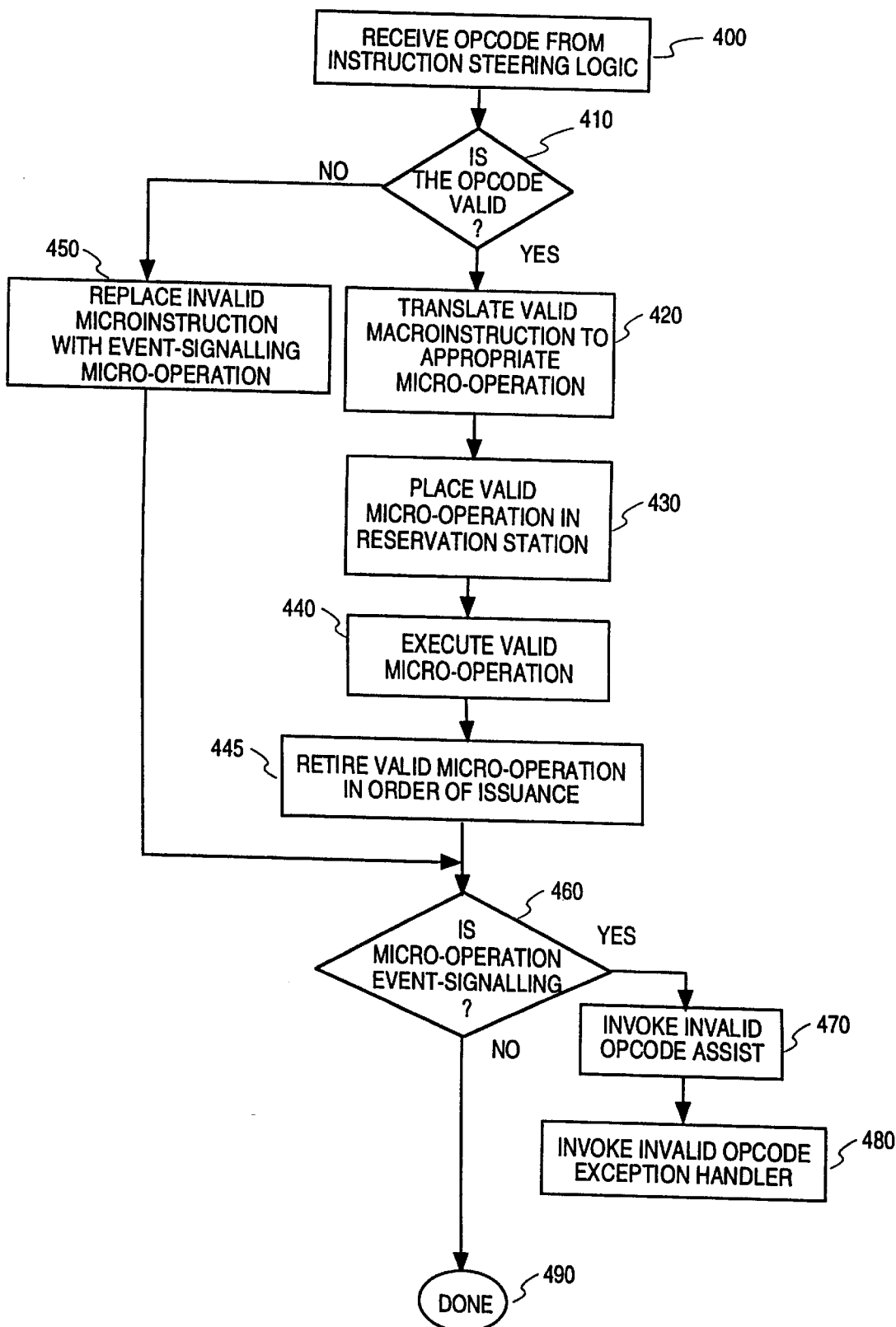
FIG. 4 is a flow diagram for handling an invalid opcode fault via the use of an event-signaling micro-operation according to the present invention.

FIG. 4 is a flow diagram for handling an invalid opcode fault via an event-signaling micro-operation according to one embodiment of the present invention. In step 400, an opcode is received by a single-cycle decoder from instruction steering logic 110. If the opcode is defined as a valid single-cycle opcode for purposes of steering, whether or not it actually represents a valid opcode, the opcode is sent to a single-cycle decoder. Otherwise, the macroinstruction is sent to a full function decoder.

If the macroinstruction contains a valid single-cycle opcode, it is translated to a single-cycle micro-operation in step 420. In step 430, the valid micro-operation is executed and in step 440, the valid micro-operation is retired.

If the macroinstruction does not contain a valid opcode, the invalid opcode is replaced with an event-signaling micro-operation in step 450. In step 460, an invalid opcode assist is invoked in response to the event-signaling micro-operation. In step 470, an invalid opcode exception handler is invoked in response to the invalid opcode assist. The invalid opcode exception handler then processes the invalid opcode according to the architecture of processor 10.

Figure 5:
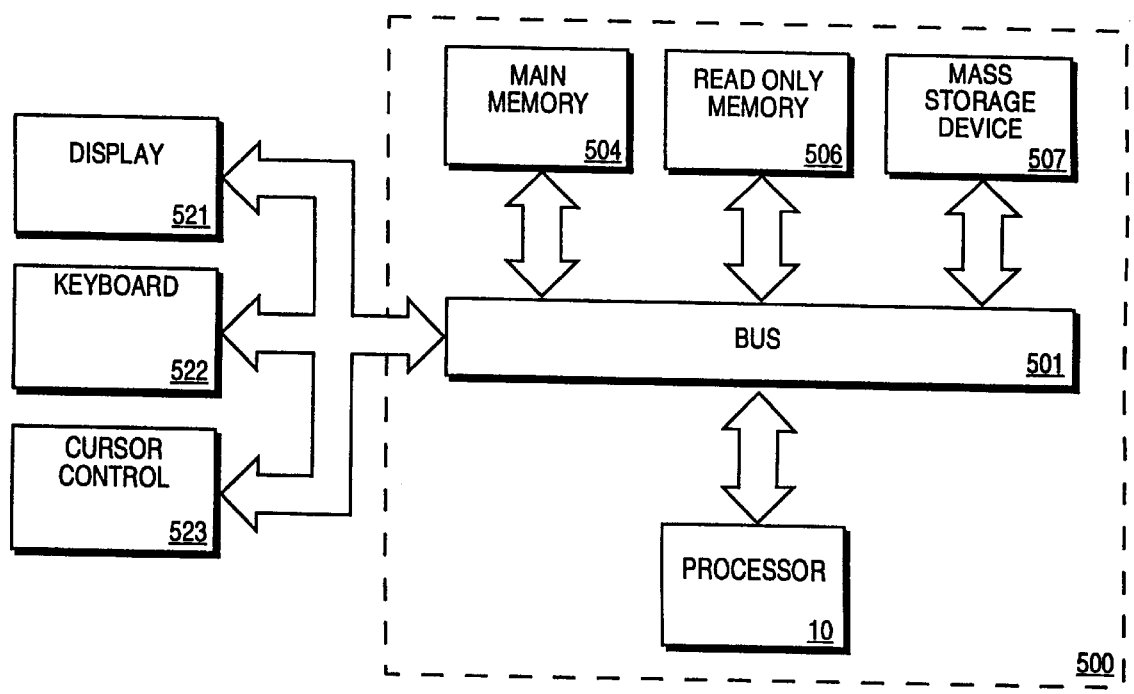
FIG. 5 is a block diagram of a computer system on which the present invention may be practiced.

FIG. 5 shows computer system 500 upon which an embodiment of the present invention can be implemented. Computer system 500 comprises a bus 501 or other communication means for communicating information, and a processor 10 coupled with bus 501 for processing information. Computer system 500 further comprises a random access memory (RAM) or other dynamic storage device 504, coupled to bus 501 for storing information and instructions to be used by processor 10. Computer system 500 also comprises a read only memory (ROM) and/or other static storage device 506 coupled to bus 501 for storing static information and instructions for processor 10. Data storage device 507 is coupled to bus 501 for storing information and instructions.

A data storage device 507 such as a magnetic disk or optical disc and its corresponding drive can be coupled to computer system 500. Computer system 500 can also be coupled via bus 501 to a display device 521, such as a cathode ray tube (CRT), for displaying information to a computer user. An alphanumeric input device 522 such as a keyboard is typically coupled to bus 501 for communicating information and command selections to processor 10. Another type of user input device is cursor control 523, such as a mouse, a trackball, or cursor direction keys for communicating direction information and command selections to processor 10 and for controlling cursor movement on display 521.

Thus, method and apparatus for handling invalid opcode faults via an event-signaling micro-operation has been described.

What is claimed is:

1. A microprocessor, comprising:
   a decoder to decode a macroinstruction into a single cycle micro-operation, the decoder configured to replace an invalid opcode in the macroinstruction, with a single-cycle event-signaling micro-operation; and
   one or more execution units coupled to the decoder that execute the single-cycle event-signaling micro-operation.

2. The microprocessor of claim 1 wherein the event-signaling micro-operation is executed in a single microprocessor cycle.

3. The microprocessor of claim 1 wherein the event-signaling micro-operation invokes an invalid opcode assist.

4. The microprocessor of claim 1 further comprising:
   event-signaling micro-operation detection logic coupled to receive results from execution of micro-operations from the one or more execution units; and
   a memory coupled to the event-signaling micro-operation detection logic, the memory storing an invalid opcode assist invoked in response to the event-signaling micro-operation results to invoke a predetermined exception handler for handling invalid opcodes encountered by the event-signaling micro-operation detection logic, wherein the invalid opcode routine operates only to call the predetermined exception handler.

5. A computer system, comprising:
   a bus;
   data and macroinstructions stored in a memory; and
   a microprocessor coupled to said bus, comprising:
      a decoder to decode macroinstructions into a single cycle micro-operation, the decoder configured to replace each invalid opcode with an event-signaling micro-operation; and
      one or more execution units coupled to the decoder; and
      event-signaling micro-operation detection logic coupled to receive results from execution of micro-operations from the one or more execution units;
   wherein the memory stores an invalid opcode routine invoked in response to the event-signaling micro-operation results to invoke a predetermined exception handler for handling invalid opcodes encountered by the event-signaling micro-operation detection logic, wherein the invalid opcode routine operates only to call the predetermined exception handler.

6. The computer system of claim 5 wherein the event-signaling micro-operation is executed in a single microprocessor cycle.

7. A method for handling an invalid micro-operation in a processor, comprising:
   replacing the invalid opcode with an event-signaling micro-operation;
   executing the event-signaling micro-operation;
   executing an invalid opcode assist in response to said event-signaling micro-operation wherein the invalid opcode assist operates only to call an invalid opcode exception handler; and
   executing the invalid opcode exception handler in response to said invalid opcode assist.

8. The method of claim 7 wherein detecting an invalid opcode is performed prior to replacing the invalid opcode with an event-signaling micro-operation.

9. The method of claim 7 wherein the exception handler corresponding to an invalid micro-operation requires multiple microprocessor clock cycles to complete.

10. A machine-readable medium having stored thereon sequences of instructions, which when executed by a processor cause the processor to:
   replace the invalid opcode with an event-signaling micro-operation;
   execute the even-signaling micro-operation;
   execute an invalid opcode assist in response to said event-signaling micro-operation wherein the invalid opcode assist operates only to call an invalid opcode exception handler and convey the cause of the fault; and execute the invalid opcode exception handler in response to said invalid opcode assist.

11. The machine-readable medium of claim 10 wherein the sequences of instructions that cause the processor to detect an invalid opcode are executed prior to sequences of instructions that cause the processor to replace the invalid opcode with an event-signaling micro-operation.

12. The machine-readable medium of claim 10 wherein the exception handler corresponding to an invalid micro-operation requires multiple microprocessor clock cycles to complete.

13. A processor comprising:
   a first decoder configured to decode a macroinstruction of a first kind into one or more multi-cycle micro-operations;
   a second decoder configured to decode a macroinstruction of a second kind into one or more single-cycle micro-operations; and
   steering logic coupled to the first decoder and to the second decoder configured to steer a macroinstruction having an invalid opcode to the second decoder;
   wherein the second decoder replaces the macroinstruction having the invalid opcode with a single-cycle event-signaling micro-operation to be executed by the processor.

14. The processor of claim 13, wherein the an invalid opcode assist is invoked in response to the single-cycle event-signaling micro-operation being executed by the processor, and further wherein the invalid opcode assist operates only to invoke an invalid opcode exception handler.

15. A processor comprising:
   a decoder configured to decode a macroinstruction having an invalid opcode into a single-cycle event-signaling micro-operation; and
   one or more execution units coupled to the decoder including at least one execution unit to execute the single-cycle event-signaling micro-operation in a single processor clock cycle to invoke an invalid opcode assist;
   wherein the invalid opcode assist operates only to invoke an invalid opcode exception handler to handle the invalid opcode.

16. A microprocessor comprising:
   a set of decoders having one or more single-cycle decoders for decoding macroinstructions of a first kind into one or more single cycle micro-operations and one or more multi-cycle decoders for decoding macroinstructions of a second kind into one or more multi-cycle micro-operations, wherein macroinstructions having an invalid opcode are decoded by a single-cycle decoder and are replaced with single-cycle event-signaling micro-operations;
   steering logic coupled to the set of decoders to steer macroinstructions of the first kind to the one or more single-cycle decoders and macroinstructions of the second kind to the one or more multi-cycle decoders, wherein macroinstructions having invalid opcodes are steered to the one or more single cycle decoders; and
   a set of execution units coupled to the set of decoders, the execution units to execute the single cycle micro-operations and the multi-cycle micro-operations, wherein execution of the event-signaling micro-operations invokes an invalid opcode assist that operates only to invoke an invalid opcode exception handler.

* * * * *